United States Patent [19]
Wheelock

[11] Patent Number: 5,027,031
[45] Date of Patent: Jun. 25, 1991

[54] TRUCK TRAILER LIGHTING CONTROL CIRCUIT

[76] Inventor: Robert K. Wheelock, 1712 Keck Ave., Evansville, Ind. 47711

[21] Appl. No.: 397,240

[22] Filed: Aug. 23, 1989

[51] Int. Cl.$^5$ .............................................. H05B 37/02
[52] U.S. Cl. ....................................... 315/77; 315/315
[58] Field of Search ...................... 315/77, 80, 81, 129, 315/130, 131, 132, 136, 315, 317, 320

[56] References Cited
U.S. PATENT DOCUMENTS
4,751,431  6/1988  Ducote ................................. 315/77

FOREIGN PATENT DOCUMENTS
2054289  2/1981  United Kingdom ................. 315/81

Primary Examiner—David Mis
Attorney, Agent, or Firm—Warren D. Flackbert

[57] ABSTRACT

A lighting control circuit having particular adaptability to tractor-trailer truck usage where a considerable increase of illumination is provided for the best interests of safety. The circuitry provides non-blinking left and right turn signal lights which supplement the blinking of the existing turn signal lights. Additionally, backup lights are programmed into the circuit operation. Through the use of a four-way flasher control, all the lights on the vehicle are caused to serve flashing, signaling an/or blinking purposes, except those provided by the invention which remain non-blinking.

6 Claims, 1 Drawing Sheet

TRUCK TRAILER LIGHTING CONTROL CIRCUIT

As is known, the usage of turn signal lights on the trailer of a tractor-trailer combination serve important safety purposes, i.e. in visually indicating to others an intended driving pattern. The controls for such an arrangement(s) are typically disposed adjacent the driver in the tractor cab and extend, through appropriate electrical wiring, to the selected signal lights.

An overall deficiency of such, however, is the need for added illumination without modifying the existing approved circuitry, either on old or new truck vehicles. In this connection, added lighting coverage would expand safety and lessen the cause of accidents.

BACKGROUND OF THE INVENTION

The invention serves to increase the provided illumination by presenting a circuit board which easily mounts on the truck trailer, which is readily spliced into existing wiring, and which achieves positive added lighting through printed circuitry including an arrangement of transistors, relays, relay coils, resistors, capacitors and individual signal lights (the latter representing an addition to those already present).

DESCRIPTION OF THE FIGURES

A better understanding of the present invention will become more apparent from the following description, taken in conjunction with the accompanying drawing, wherein.

Figure 1:
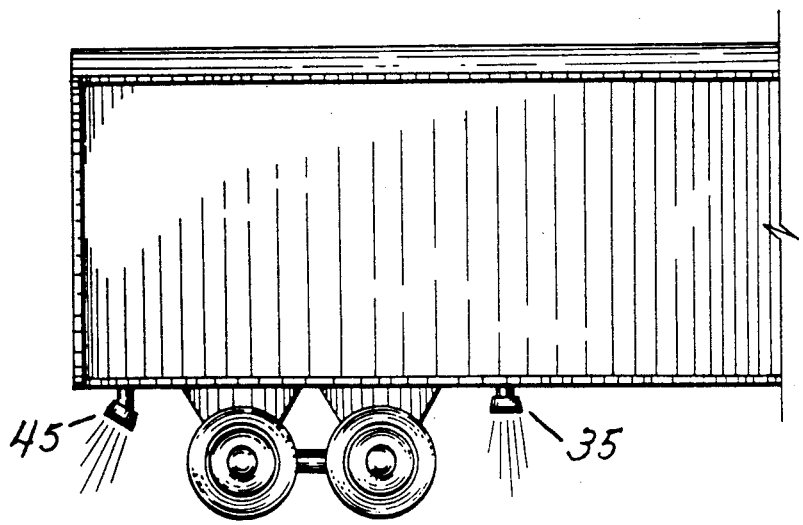
FIG. 1 is a view in side elevation of a representative usage of the invention, showing lights added onto a truck trailer and controlled by the circuitry presented herein; and, FIG. 2 is a showing of the lighting control circuit in accordance with the teachings of the present invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

In a typical use situation, the invention is spliced into the conventional wiring extending from the tractor cab, at an operative control location proximate the driver, to the right and left turn lights, and the clearance lights (all of which are not shown). The aforesaid wiring passes through a junction box (also not shown) typically positioned on the trailer proximate the right rear tires, presenting four wires, one for the left turn signal, one for the right turn signal, one for the clearance lights, and one to ground.

In any event, a circuit board 10 on which the circuitry herein is presented is typically mounted adjacent the aforesaid junction box so that splicing into the already present wiring is readily accomplished without any modification (except for such splicing).

With circuit board 10 mounted in position, splicing is completed to and from the conventional installed circuits, i.e. to input 20, for the left turn signal; input 30, for the right turn signal; input 40, for the clearance lights; and, input 50 to ground.

In employing the invention, and referring to FIG. 1, additional lights are utilized in combination with the already existing lights, to-wit, those representative of right turn signal light [25], left turn signal light [35], and backup lights [45](not presently available). In other words, and with the use of the invention, the lighting potential is increased manyfold, minimizing judgement error on the part of the driver by presenting extra lighting as, for example, when backing into a poorly lighted or unlighted alley or street.

Figure 2:
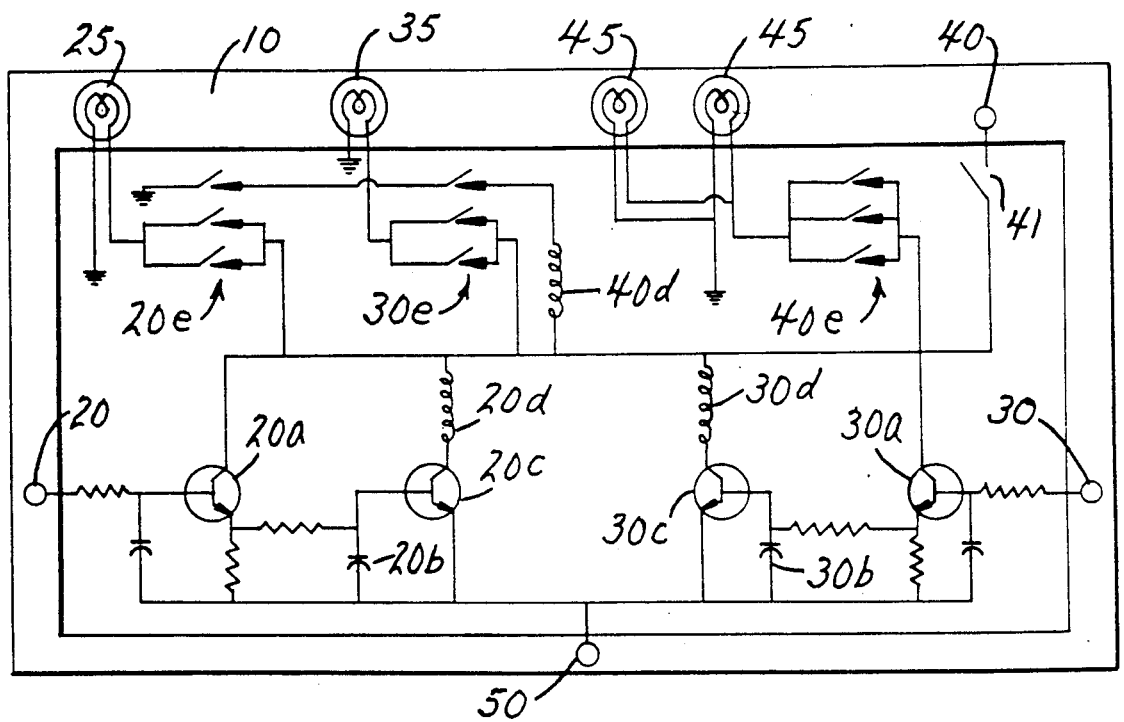

Looking at the circuitry of FIG. 2, and when the driver actuates the left turn signal control, the existing left turn signal light blinks. At this time, transistor 20a begins to function at the same blinking rate as the existing left turn blinking light, with transistor 20a charging capacitor 20b (which is value selected to be a "slow charge" component). The charge to capacitor 20b continues to a point when transistor 20c is actuated, holding the latter in an energized condition as long as the transistor 20a is blinking and for, probably, three to four seconds after the blinking is discontinued.

The actuation of transistor 20c energizes a coil 20d which, in turn, places relay 20e in an "on" condition and causes the left turn signal light 25 of the invention to become energized. At this point, light 25, non-blinking, remains energized and the original light is still blinking, meaning, however, a manyfold power illumination increase. In other words, and importantly, the arrangement is such as to convert power flow from an originally installed blinking light to an added (by the instant circuitry) non-blinking light.

The operational sequence involved with the right turn signal is quite similar to that described above. In this connection, when the driver actuates the right turn signal control, the existing right turn signal light blinks. At this time, transistor 30a begins to function at the same blinking rate as the existing right turn blinking light, with transistor 30a charging capacitor 30b (which is value selected to be a "slow charge" component). The charge to capacitor 30b continues to a point when transistor 30c is actuated, holding the latter in an energized condition as long as transistor 30a is blinking and for, probably, three to four seconds after the blinking is discontinued.

The actuation of transistor 30c energizes coil 30d which, in turn, places relay 30e in an "on" condition and causes the right turn signal light 35 of the invention to become energized. At this point, light 35, non-blinking, remains energized and the original light is still blinking, meaning, again, an increase in illuminated power.

The circuitry is so arranged that the backup lights 45 (new to the vehicle), and operative by the invention, function only when the driver initiates the four-way flasher lights, such energizing the left turn signal light 25 and the right turn signal light 35. As apparent from the preceding, lighting of the left turn signal light 25 and the right turn signal light 35 (controlled by the invention) occurs when relay 20e and relay 30e are closed. With such occurrence, the coil 40d of relay 40e is energized, meaning that the backup lights 45 are operating. Restated otherwise, both right and left turn signal lights must be actuated by the invention for the backup lights to function.

As to the common four-way flasher lights (also known as hazard lights or emergency lights and located at the front corners of the tractor and the rear corners of the trailer), the control (in the tractor) for such is activated by the driver, both the left turn signal light 25 and right turn signal light 35 are energized, followed by backup lights 45. All flasher lights blink at the same rate, but lights 25, 35 and 45, operated by the circuitry of the invention, continue to function in a non-blinking mode.

FIG. 2 also discloses, as part of the circuitry, a normally closed switch 41, serving as a main control, which, when opened, turns off the entire system. The circuitry is completed with the ground input 50 spliced into the ground wire at the junction.

Thus, except for the splicing of the circuit board 10 of the invention into the original circuitry, the latter remains untouched, irrespective of vehicle age or type. Restated otherwise, by a convenient splicing operation, the available illumination for a vehicle trailer can be substantially increased.

It should be evident from the preceding that the truck-trailer lighting control circuit presented by the invention serves to considerably increase illumination in the best interests of safety. The invention represents simplicity in installation, requiring splicing to already existing wiring for various lighting functions.

The original turn signal lights, which typically blink, are implemented by non-blinking lights operative by the instant circuitry. Backup lights, on either side of the trailer, are energized upon actuation of both of the turn signal lights. Additionally, all normally blinking lights are caused to simultaneously blink upon actuation of the four-way flasher lights, augmented by the non-blinking lights operative by the invention.

The circuitry described above is susceptible to various changes within the spirit of the invention, including, by way of example, the positioning of the circuit board; the ultimate value of the electrical components; and, the like. Thus, the preceding should be considered illustrative and not as limiting the scope of the following claims:

I claim:

1. In combination with a first circuit having a selectively blinking first signal light, a second circuit including a first transistor controlled by a blink signal controlling said first signal light and actuated on and off with said first signal light of said first circuit and a second transistor actuated, and maintained actuated, by a capacitor slowly charged by operation of said first transistor, energizing a coil actuated relay controlling the energization of a second non-blinking signal light cause by operation of said first blinking signal light.

2. The combination of claim 1 where said second circuit is spliced into said first circuit.

3. The combination of claim 1 in combination with a third circuit having a selectively blinking third signal light, a fourth circuit including a third transistor controlled by a blink signal controlling said third signal light and actuated on and off with said third signal light of said third circuit and a fourth transistor actuated, and maintained actuated, by a capacitor slowly charged by operation of said third transistor, energizing a coil actuated relay controlling the energization of a fourth non-blinking signal light caused by operation of said third blinking signal light.

4. The combination of claim 3 where said second circuit is spliced into said first circuit, and where said fourth circuit is spliced into said third circuit.

5. The combination of claim 3 in combination with a fifth circuit, where said fifth circuit, controlling operation of another signal light, becomes operative only upon energization of said relays in said second and said fourth circuits.

6. The combination of claim 5 where said another signal light provides non-blinking illumination.

* * * * *